(12) United States Patent
Berneth et al.

(10) Patent No.: US 6,896,945 B2
(45) Date of Patent: May 24, 2005

(54) OPTICAL DATA CARRIER COMPRISING A PHTHALOCYANINE DYE AS LIGHT-ABSORBENT COMPOUND IN THE INFORMATION LAYER

(75) Inventors: Horst Berneth, Leverkusen (DE); Friedrich-Karl Bruder, Krefeld (DE); Wilfried Haese, Odenthal (DE); Rainer Hagen, Leverkusen (DE); Karin Hassenrück, Düsseldorf (DE); Serguei Kostromine, Swisttal (DE); Peter Landenberger, Köln (DE); Rafael Oser, Krefeld (DE); Thomas Sommermann, Bergisch Gladbach (DE); Josef-Walter Stawitz, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 37 days.

(21) Appl. No.: 10/222,609

(22) Filed: Aug. 16, 2002

(65) Prior Publication Data
US 2003/0064192 A1 Apr. 3, 2003

(30) Foreign Application Priority Data

| Aug. 22, 2001 | (DE) | 101 40 165 |
| Oct. 4, 2001 | (EP) | 01123810 |
| Dec. 21, 2001 | (EP) | 01130527 |
| Mar. 11, 2002 | (EP) | 02005505 |
| Mar. 19, 2002 | (DE) | 102 12 199 |

(51) Int. Cl.$^7$ .................................................. B32B 3/02
(52) U.S. Cl. ................... 428/64.1; 428/64.4; 428/64.8; 430/270.14; 430/270.16
(58) Field of Search .................. 428/64.1, 64.4, 428/64.8, 913; 430/270.14, 270.16, 495.1, 945

(56) References Cited

U.S. PATENT DOCUMENTS 3,094,536 A  6/1963  Kenney et al. .......... 260/314.5

4,917,989 A  4/1990  Albert et al. ............... 430/270

(Continued)

FOREIGN PATENT DOCUMENTS

| CA | 2310461 | 6/1999 |
| EP | 0 418 611 | 3/1991 |

(Continued)

OTHER PUBLICATIONS

Patent Abstracts of Japan vol. 1999, No. 08, 30. Juni. 1999 & JP 11 058953 A (Matsushita Electric Ind Co Ltd), 2. Marz 1999 Zusammenfassung.

*Primary Examiner*—Elizabeth Mulvaney
(74) *Attorney, Agent, or Firm*—Jill Denesvich; Godfried R. Akorli

(57) ABSTRACT

The invention relates to an optical data carrier having a preferably transparent substrate that has optionally previously been coated with one or more reflection layers and to the surface of which has been applied a light-writeable information layer, optionally one or more reflection layers, and optionally a protective layer or a further substrate or a covering layer, such that the optical data carrier can be written on or read by means of blue light (preferably laser light having a specified wavelength) or by means of infrared light (preferably laser light having a specified wavelength), wherein the information layer contains
(i) light-absorbent phthalocyanine dyes of the formula (I)

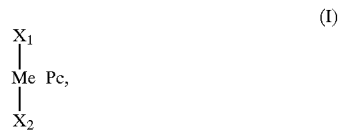

where
  Me is a doubly axially substituted Si, Ge, and Sn atom,
  Pc is an unsubstituted phthalocyanine, and
  $X_1$ and $X_2$ are each independently halogen, and
(ii) optionally, a binder.

21 Claims, 3 Drawing Sheets

U.S. PATENT DOCUMENTS

| | | | |
|---|---|---|---|
| 5,248,538 A | 9/1993 | Kovacs et al. | 428/64 |
| 5,266,699 A | 11/1993 | Naef et al. | 546/61 |
| 5,281,616 A | 1/1994 | Dixon et al. | 514/410 |
| 5,428,153 A * | 6/1995 | Nonaka | 540/138 |
| 5,622,801 A | 4/1997 | Nukada et al. | 430/58 |
| 6,399,768 B1 | 6/2002 | Wolleb et al. | 540/140 |
| 2002/0076648 A1 * | 6/2002 | Berneth et al. | 430/270.17 |
| 2003/0113665 A1 * | 6/2003 | Berneth et al. | 430/270.16 |

FOREIGN PATENT DOCUMENTS

| | | |
|---|---|---|
| EP | 0 575 816 | 12/1993 |
| JP | 6-336086 | 12/1994 |
| JP | 8-191171 | 7/1996 |
| JP | 2-557335 | 11/1996 |
| JP | 9-50629 | 2/1997 |
| JP | 10-58828 | 3/1998 |
| JP | 10-181206 | 7/1998 |
| JP | 11-43481 | 2/1999 |
| JP | 11-273147 | 10/1999 |

* cited by examiner

OPTICAL DATA CARRIER COMPRISING A PHTHALOCYANINE DYE AS LIGHT-ABSORBENT COMPOUND IN THE INFORMATION LAYER

BACKGROUND OF THE INVENTION

The invention relates to a write-once optical data carrier comprising at least one phthalocyanine dye as light-absorbent compound in the information layer, to a process for its production, and to the application of the above-mentioned dyes to a polymer substrate, particularly polycarbonate, by spin coating, vapor deposition, or sputtering.

Write-once optical data carriers using specific light-absorbent substances or mixtures thereof are particularly suitable for use in high-density writeable optical data stores which operate with blue laser diodes, in particular GaN or SHG laser diodes (360 to 460 nm) and/or for use in DVD-R or CD-R disks that operate with red (635 to 660 nm) or infrared (780 to 830 nm) laser diodes.

The write-once compact disk (CD-R, 780 nm) has recently experienced enormous volume growth and represents the technically established system.

The next generation of optical data stores—DVDs—has recently been introduced onto the market. Through the use of shorter-wavelength laser radiation (635 to 660 nm) and higher numerical aperture (NA), the storage density can be increased. The write-once format in this case is DVD-R.

Today, optical data storage formats which use blue laser diodes (based on GaN, JP-A 08-191,171 or Second Harmonic Generation SHG JP-A 09-50,629) (360 nm to 460 nm) with high laser power are being developed. Writeable optical data stores will therefore also be used in this generation. The achievable storage density depends on the focusing of the laser spot in the information plane. Spot-size scales with the laser wavelength $\lambda$/NA. NA is the numerical aperture of the objective lens used. In order to obtain the highest possible storage density, the use of the smallest possible wavelength $\lambda$ is the aim. At present 390 nm is possible on the basis of semiconductor laser diodes.

The patent literature describes dye-based writeable optical data stores which are equally suitable for CD-R and DVD-R systems (JP-A 11-43,481 and JP-A 10-181,206). To achieve a high reflectivity and a high modulation height of the read-out signal and also to achieve sufficient sensitivity in writing, use is made of the fact that the IR wavelength 780 nm of CD-Rs is located at the foot of the long wavelength flank of the absorption peak of the dye and the red wavelength of 635 nm or 650 nm of DVD-Rs is located at the foot of the short wavelength flank of the absorption peak of the dye (cf. EP-A 519,395 and WO-A 00/09522). In JP-A 02-557,335, JP-A 10-58,828, JP-A 06-336,086, JP-A 02-865,955, WO-A 09 917,284, and U.S. Pat. No. 5,266,699, this concept is extended to the 450 nm working wavelength region on the short wavelength flank and the red and IR region on the long wavelength flank of the absorption peak.

Apart from the above-mentioned optical properties, the writeable information layer comprising light-absorbent organic substances must have a substantially amorphous morphology to keep the noise signal during writing or reading as small as possible. For this reason, it is particularly preferred that crystallization of the light-absorbent substances be prevented in the application of the substances by spin coating from a solution, by sputtering, or by vapor deposition and/or sublimation during subsequent covering with metallic or dielectric layers under reduced pressure.

The amorphous layer comprising light-absorbent substances preferably has a high heat distortion resistance, since otherwise further layers of organic or inorganic material which are applied to the light-absorbent information layer by sputtering or vapor deposition would form blurred boundaries due to diffusion and thus adversely affect the reflectivity. Furthermore, a light-absorbent substance that has insufficient heat distortion resistance can, at the boundary to a polymeric support, diffuse into the latter and once again adversely affect the reflectivity.

A light-absorbent substance for which the vapor pressure is too high can sublime during the above-mentioned deposition of further layers in a high vacuum and thus reduce the layer thickness to below the desired value. This once again has an adverse effect on the reflectivity.

It is therefore an object of the invention to provide suitable compounds that satisfy the high requirements (e.g., light stability, favourable signal/noise ratio, damage-free application to the substrate, and the like) for use in the information layer in a write-once optical data carrier, particularly for high-density writeable optical data store formats in a laser wavelength range from 360 to 460 nm.

Surprisingly, it has been found that specific light-absorbent phthalocyanine compounds can satisfy the above-mentioned requirement profile particularly well. Phthalocyanines display an intense absorption in wavelength range 360 to 460 nm which is important for the laser, viz. the B or Soret bands.

SUMMARY OF THE INVENTION

The present invention accordingly provides an optical data carrier comprising a substrate (preferably transparent substrate) that optionally has previously been coated with one or more reflection layers and to the surface of which has been applied a light-writeable information layer, optionally one or more reflection layers, and optionally a protective layer or a further substrate or a covering layer, such that the optical data carrier can be written on or read by means of blue light (preferably laser light, particularly preferably light having a wavelength of 360 to 460 nm, particularly 380 to 420 nm, very particularly preferably 390 to 410 nm) or by means of infrared light (preferably laser light, particularly preferably light having a wavelength of 760 to 830 nm), wherein the information layer comprises (i) a light-absorbent compound comprising at least one phthalocyanine dye of the formula (I)

where

Me is a doubly axially substituted metal atom selected from the group consisting of Si, Ge, and Sn, Pc is an unsubstituted phthalocyanine, and $X_1$ and $X_2$ are each, independently of one another, halogen (particularly fluorine, chlorine, or bromine), and (ii) optionally, a binder.

In a preferred embodiment, phthalocyamines of the formula (I) in which $X_1$ and $X_2$ are each chlorine are used as the light-absorbent compound.

Very particular preference is given to phthalocyanines of the formulas (Ia), (Ib), (Ic), and (Id)

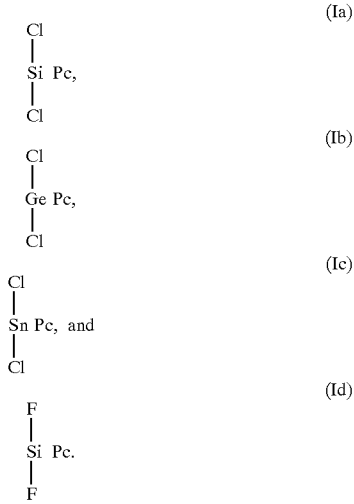

DETAILED DESCRIPTION OF THE INVENTION

Figure 1:
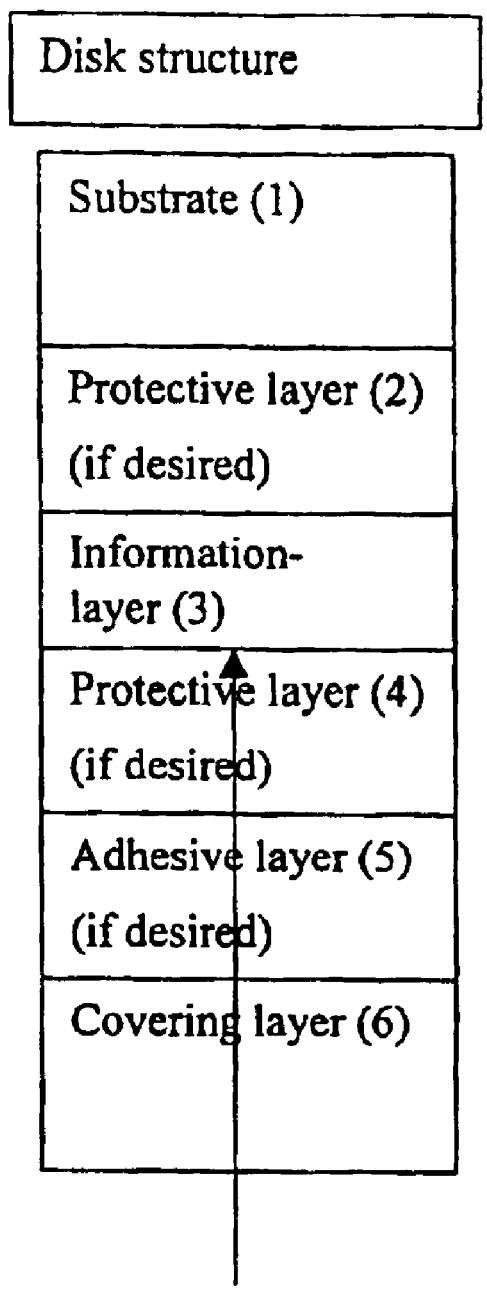
FIGS. 1, 2, and 3 illustrate structures of representative optical data carriers according to the invention. The arrow shows the path of light used for writing on or reading from the optical data carrier. For more details see p. 11–12.

The phthalocyanines used according to the invention are known from, for example, Carl W. Dirk et al., *J. Am. Chem. Soc.*, 105, 1539–1550 (1983), as precursors for preparing electrically conductive polymers and can be prepared as described therein.

They can in principle be prepared by known methods, e.g.:

by ring synthesis from phthalonitrile or aminoiminoisoindole in the presence of the appropriate metal halides, if desired, reaction of phthalonitrile or aminoiminoisoindole with water in suitable solvents (for example, pyridine) to form phthalocyanines of the formula (I) in which $X_1=X_2=OH$, if desired, replacement of the axial substituents $X_1=X_2=$ halide by other desired halides, if desired, replacement of the axial substituents $X1=X_2=$ OH by the appropriate halides by reaction with $HX_1/HX_2$.

The light-absorbent compounds are able to be changed thermally.

The thermal change preferably occurs at a temperature of <600° C. Such a change can be, for example, a decomposition or chemical change of the chromophoric center of the light-absorbent compound.

The described light-absorbent substances guarantee a sufficiently high reflectivity of the optical data carrier in the unwritten state and a sufficiently high absorption for thermal degradation of the information layer on point-wise illumination with focused blue light, particularly laser light, preferably light having a wavelength in the range from 360 to 460 nm. The contrast between written and unwritten points on the data carrier is achieved by the reflectivity change of the amplitude and also the phase of the incident light due to the changed optical properties of the information layer after the thermal degradation. This means that the optical data carrier can preferably be written on and read by means of laser light having a wavelength of 360 to 460 nm.

The optical data carrier can likewise be written on and read by means of infrared light, particularly laser light having a wavelength of 760 to 830 nm, with the groove spacing and geometry then preferably being matched to the wavelength and the numerical aperture.

The invention further provides for the use of the phthalocyanines of the formula (I) as light-absorbent compounds in the information layer of optical storage media.

The invention likewise provides for the use of the phthalocyanines of the formula (I) for producing optical storage media. The phthalocyanines are preferably used as light-absorbent compounds in the information layer.

The phthalocyanines that are particularly preferably used in these applications have a content of more than 90% by weight (particularly more than 95% by weight, particularly preferably more than 98% by weight) of the phthalocyanine of the formula (I), based on material used.

Very particular preference is given to using a phthalocyanine of the formula (Ia) having the following reflection maxima at 2θ (theta) measured in degrees in the X-ray diffraction pattern: 10.7, 11.6, 12.2, 13.7, 14.2, 15.0, 15.5, 15.7, 17.5, 18.6, 19.8, 20.3, 20.8, 21.4, 22.5, 23.2, 23.7, 24.5, 25.4, 26.0, 26.4, 26.8, 27.2, 27.5, 28.3, 29.4, 30.2, 30.6, 31.6, 32.4, 33.2, 33.8, 34.8, 35.9, and 36.7.

Particular preference is likewise given to a phthalocyanine of the formula (Ib) having the following reflection maxima at 2θ (theta) measured in degrees in the X-ray diffraction pattern: 10.6, 11.4, 11.8, 12.3, 13.9, 14.6, 15.3, 15.5, 17.4, 18.4, 19.7, 20.5, 22.3, 22.7, 23.0, 23.4 24.0, 24.5, 25.5, 26.0, 26.8, 27.4, 28.0, 29.1, 29.6, 31.4, 33.5, 34.5, 35.3, 35.7, and 37.3.

Particular preference is likewise given to a phthalocyanine of the formula (Ic) having the following reflection maxima at 2θ (theta) measured in degrees in the X-ray diffraction pattern: 8.5, 9.4, 10.6, 12.3, 13.1, 13.9, 15.2, 16.0, 16.5, 16.9, 17.5, 18.1, 19.0, 19.4, 20.1, 20.7, 22.4, 23.1, 23.5, 24.2, 24.9, 26.6, 27.7, 28.3, 28.7, 29.4, 30.1, 30.8, 31.7, 33.0, 34.0, 35.0, and 35.5.

The X-ray diffraction patterns were recorded using a Siemens D 5000 powder diffractometer at the wavelength of Cu—$K_\alpha$ radiation.

The invention further provides a particulate solid preparation of a compound of the formula (I) in which the particles have a mean particle size of from 0.5 μm to 10 mm.

In a preferred embodiment of the particulate solid preparations, preference is given to those having a mean particle size of from 0.5 to 20 μm (particularly from 1 to 10 μm), hereinafter referred to as finely divided powder. Such finely divided powders can, for example, be produced by milling.

Preference is likewise given to particulate solid preparations having a mean particle size of from 50 to 300 μm, hereinafter referred to as fine crystalline form.

Further preferred particulate solid preparations are those having a mean particle size of from 50 μm to 10 mm (preferably from 100 μm to 800 μm), which form a particulate shaped body as agglomerates or conglomerates of primary particles. Such shaped bodies can, for example, have the shape of droplets, raspberries, flakes, or rods, hereinafter referred to as granulated materials.

The particle size of the fine crystalline form can, for example, be set via the synthesis parameters. For example, rapid heating (for example, over a period of from 30 to 60 minutes) of the mixture of the components (i.e., phthalonitrile or aminoiminoisoindole and the appropriate metal halide in the appropriate solvent) to the reaction temperature (for example, from 160 to 220° C.) preferentially forms a finely divided form. A similar result is achieved when the metal halide is added to the reaction mixture (i.e., phthalonitrile or aminoiminoisoindole in the appropriate solvent) only at the reaction temperature, for example, from 160 to 190° C. Slow heating (for example, over a period of from 65 to 250 minutes) of the mixture of the components to the reaction temperature (for example, from 160 to 220° C.) preferably forms a coarse form.

The particulate solid preparations of the invention preferably comprise 80 to 100% by weight (preferably 95 to 100%) of phthalocyanine, 0.1 to 1.0% by weight (preferably 0.1 to 0.5% by weight), of residual moisture, 0 to 10% by weight of inorganic salts, and 0 to 10% by weight (preferably 0 to 5% by weight) of further additives such as dispersants, surfactants, and/or wetting agents, where the percentages are in each case based on the preparation and the sum of the proportions specified is 100%.

The solid preparations of the invention are preferably low in dust, are free-flowing, and have a good storage stability.

The granulated materials can be produced in various ways, e.g., by spray drying, fluidized-bed spray granulation, fluidized-bed agglomeration granulation, or powder fluidized-bed agglomeration.

Granulation is preferably carried out by spray drying, with possible spraying devices including both rotary disk atomizers and single-fluid and two-fluid nozzles. Preference is given to a single-fluid nozzle, particularly a twist chamber nozzle, that is preferably operated at a feed pressure of 20 to 80 bar.

The inlet and outlet temperatures in the spray drying process depend on the desired residual moisture content, on safety considerations, and also on economic considerations. The inlet temperature is preferably 120 to 200° C. (particularly 140 to 180° C.) and the outlet temperature is preferably 40 to 80° C.

In the production of the granulated materials, the filter cake of dye, optionally together with auxiliaries and additives, is generally intensively mixed in a stirred vessel. The crystals of the suspension are preferably broken down in a mill (e.g., a bead mill) so that a finely divided sprayable suspension is obtained.

In a preferred embodiment, the dye suspension is an aqueous suspension. Granulation is carried out in the spray drying process.

The invention further provides solid shaped bodies such as pellets, rods, and the like, comprising a phthalocyanine of the formula (I), preferably in an amount of more than 90% by weight (particularly more than 95% by weight, preferably more than 98% by weight), based on the shaped body. Further additives to the shaped bodies can be binders. The sum of phthalocyanine of the formula (I) and binder is preferably more than 95% by weight, more preferably more than 99% by weight.

Such shaped bodies can be produced, for example, by pressing the phthalocyanine of the formula (I), if appropriate in the presence of binders, at a pressure of from 5 to 50 bar, preferably from 10 to 20 bar.

The invention likewise provides dispersions, preferably aqueous dispersions, containing a metal complex of the formula (I), preferably in an amount of from 10 to 90% by weight, based on the dispersion. Suitable dispersants are, for example, polymeric dispersants based on acrylate, urethanes, or long-chain polyoxyethylene compounds. Suitable products are, for example, Solsperse 32000 or Solsperse 38000 from Avecia.

The invention likewise provides a process for coating substrates with the phthalocyanines of the formula (I). This is preferably carried out by spin coating, sputtering, or vacuum coating. In particular, the phthalocyanines of the formulas (Ia), (Ib), (Ic), and (Id) can be applied by vacuum coating or sputtering, particularly vacuum coating.

Starting materials for coating by sputtering or vacuum coating are all the above-mentioned forms of the phthalocyanines of the formula (I), i.e., finely divided powders, fine crystalline forms or granulated material, particulate solid preparations, solid shaped bodies, and dispersions. The latter are used in particular for applying finely divided phthalocyanines to a surface from which they can then be applied to the substrate by sputtering or vacuum coating.

For these procedures, preference is given to phthalocyanine purities of greater than 50%, particularly preferably greater than 85% and very particularly preferably greater than 90%, most particularly greater than 95% or greater than 98%.

The phthalocyanines can be mixed with one another or with other dyes having similar spectral properties. The information layer can comprise the phthalocyanines together with additives such as binders, wetting agents, stabilizers, diluents, and sensitizers, as well as further constituents.

The invention further provides an apparatus for application of light-absorbent compounds to a substrate by vapor deposition to produce optical storage media, wherein the dye can be vaporized by heating at a low background pressure and deposited on the substrate. The background pressure is below $10^{-1}$ Pa, preferably below $10^{-3}$ Pa, particularly preferably below $10^{-4}$ Pa. The dye is preferably heated by resistance heating or by microwave absorption.

The invention provides, in particular, an optical data carrier as described above in which the light-absorbent compound of the formula (I), optionally together with the above-mentioned additives, forms an information layer that is optically amorphous. For the purposes of the present invention, the term "amorphous" means that no crystallites can be observed by means of an optical microscope and an X-ray beam produces no Bragg reflections but only an amorphous halo.

Apart from the information layer, further layers such as metal layers, dielectric layers, and protective layers may be present in the optical data carrier. Metals and dielectric layers serve, inter alia, to adjust the reflectivity and the heat absorption/retention. Metals can be, depending on the laser wavelength, gold, silver, aluminum, alloys, and the like. Examples of dielectric layers are silicon dioxide and silicon nitride. Protective layers are, for example, photocurable surface coatings, adhesive layers, and protective films.

The adhesive layers may be pressure-sensitive. Pressure-sensitive adhesive layers consist mainly of acrylic adhesives. Nitto Denko DA-8320 or DA-8310, disclosed in the Patent JP-A 11-273147, can, for example, be used for this purpose.

The optical data carrier has, for example, the following layer structure (cf. FIG. 1): a transparent substrate (1), optionally a protective layer (2), an information layer (3), optionally a protective layer (4), optionally an adhesive layer (5), and a covering layer (6).

The structure of the optical data carrier preferably:

comprises a preferably transparent substrate (1) to the surface of which have been applied at least one light-writeable information layer (3) that can be written on by means of light (preferably laser light), an optional protective layer (4), an optional adhesive layer (5), and a transparent covering layer (6).

comprises a preferably transparent substrate (1) to the surface of which have been applied a protective layer (2), at least one information layer (3) that can be written on by means of light (preferably laser light), an optional adhesive layer (5), and a transparent covering layer (6).

comprises a preferably transparent substrate (1) to the surface of which have been applied an optional protective layer (2), at least one information layer (3) that can be written on by means of light (preferably laser light), an optional protective layer (4), an optional adhesive layer (5), and a transparent covering layer (6).

comprises a preferably transparent substrate (1) to the surface of which have been applied at least one information layer (3) that can be written on by means of light (preferably laser light), an optional adhesive layer (5), and a transparent covering layer (6).

Figure 2:
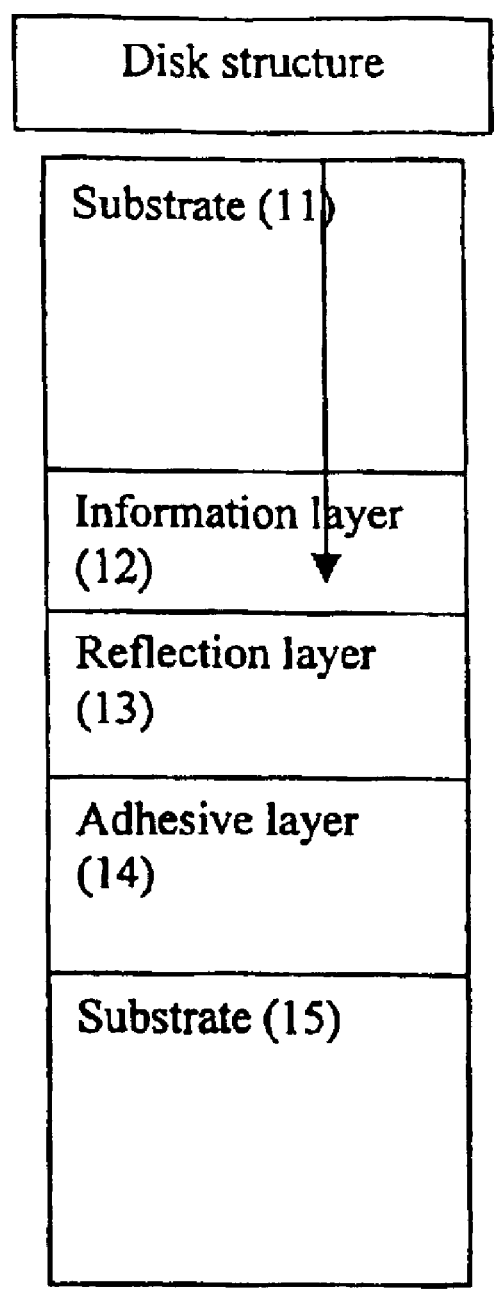

Alternatively, the optical data carrier has, for example, the following layer structure (cf. FIG. 2): a preferably transparent substrate (11), an information layer (12), an optional reflection layer (13), an optional adhesive layer (14), and a further, preferably transparent, substrate (15).

Figure 3:
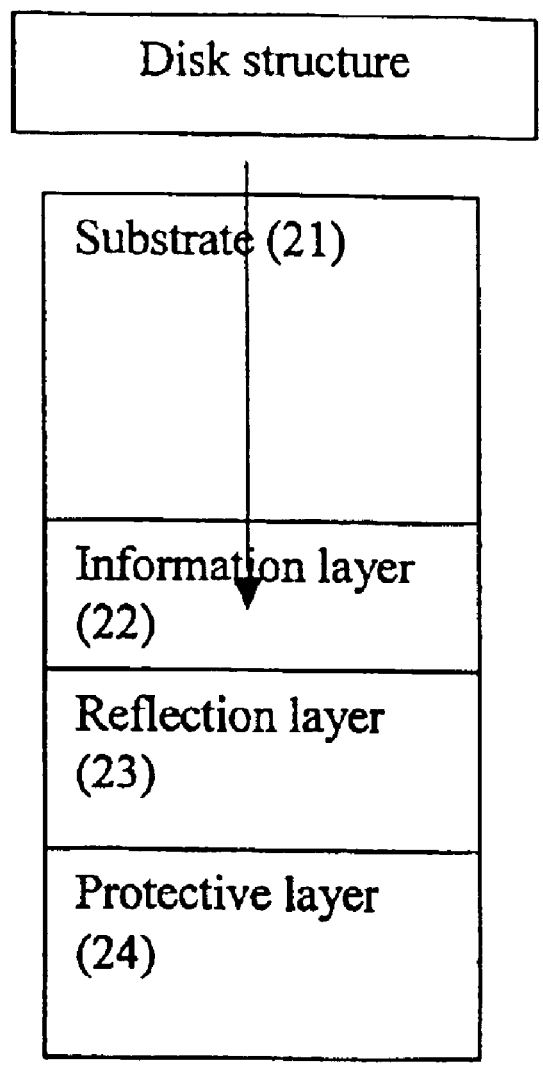

Alternatively, the optical data carrier has, for example, the following layer structure (cf. FIG. 3): a preferably transparent substrate (21), an information layer (22), an optional reflection layer (23), and a protective layer (24).

Alternatively, the structure of the optical data carrier can comprise a plurality of information layers that are preferably separated by suitable layers. Particularly preferred separation layers are photocurable surface coatings, adhesive layers, dielectric layers, or reflection layers.

The invention further provides optical data carriers according to the invention that have been written on by means of blue light, particularly laser light, particularly preferably laser light having a wavelength of 360 to 460 nm.

The following examples illustrate the subject-matter of the invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Example 1

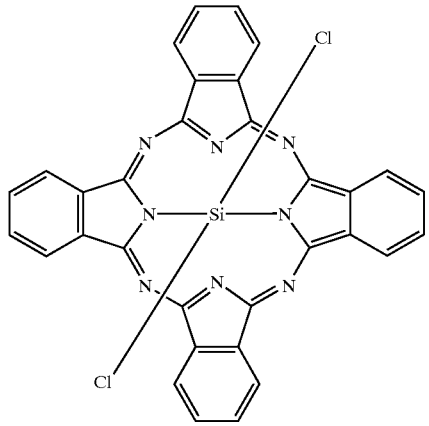

The dye dichlorosilicon phthalocyanine (SiCl$_2$Pc) was vaporized in a high vacuum (pressure p≈2·10$^{-5}$ mbar) from a resistance-heated molybdenum boat and deposited at a rate of about 5 Å/s onto a pregrooved polycarbonate substrate. The layer thickness was about 70 nm. The pregrooved polycarbonate substrate had been produced as a disk by means of injection molding. The diameter of the disk was 120 mm and its thickness was 0.6 mm. The groove structure produced in the injection-molding process had a track spacing of about 1 μm and the groove depth and groove width at half depth were about 150 nm and about 260 nm, respectively. 100 nm of Ag were applied by vapor deposition to the disk with the dye layer as information carrier. A UV-curable acrylic coating composition was subsequently applied by spin coating and cured by means of a UV lamp. The disk was tested by means of a dynamic writing test apparatus constructed on an optical tester bench comprising a GaN diode laser (λ=405 nm) for generating linearly polarized light, a polarization-sensitive beam splitter, a λ/4 plate and a movably suspended collecting lens having a numerical aperture NA=0.65 (actuator lens). The light reflected from the reflection layer of the disk was taken out from the beam path by means of the above-mentioned polarization-sensitive beam splitter and focused by means of an astigmatic lens onto a four-quadrant detector. At a linear velocity V=5.24 m/s and a writing power P$_w$=13 mW, a signal/noise ratio C/N=25 dB was measured. The writing power was applied as a pulse sequence, with the disk being irradiated alternately for 1 μs with the above-mentioned writing power P$_w$ and for 4 μs with the reading power P$_r$=0.44 mW. The disk was irradiated with this pulse sequence until it had rotated once. The marking produced in this way was then read using the reading power P$_r$=0.44 mW and the above-mentioned signal/noise ratio C/N was measured.

Example 2

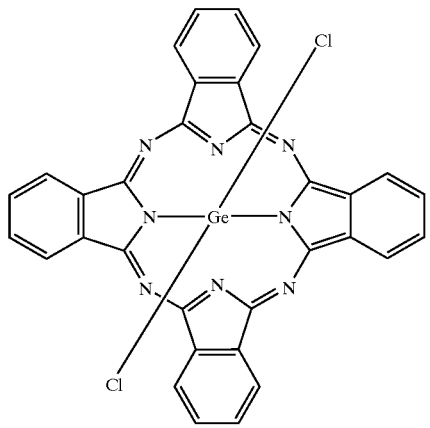

Using a method analogous to Example 1, a 45 nm thick layer of the dye dichlorogermanium phthalocyanine was applied by vapor deposition to a disk having the same thickness and groove structure. Using the same optical apparatus and the same writing strategy (writing power P$_w$=13 mW, reading power P$_r$=0.44 mW), a signal/noise ratio C/N=46 dB was measured at a linear velocity of V=4.19 m/s.

The procedure of Examples 1 and 2 was repeated using the phthalocyanines of the following examples and these dyes displayed comparable properties.

Example 3

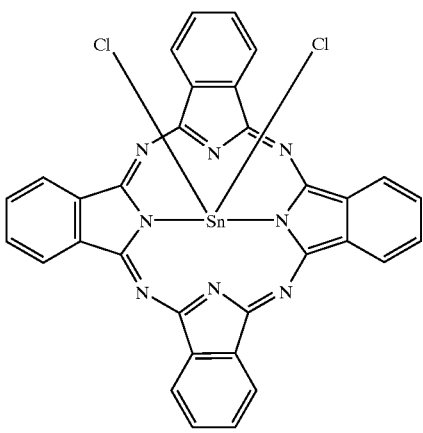

Using a method analogous to Example 1, a 50 nm thick layer of the dye dichlorotin phthalocyanine was applied by vapor deposition to a disk having the same thickness and groove structure. Using the same optical apparatus and the same writing strategy (writing power $P_w$=13 mW, reading power $P_r$=0.44 mW), a signal/noise ratio C/N=40 dB was measured at a linear velocity of V=4.19 m/s.

Example 4

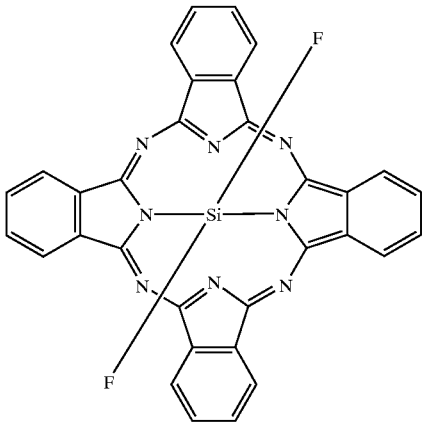

Using a method analogous to Example 1, a 60 nm thick layer of the dye difluorosilicon phthalocyanine was applied by vapor deposition to a disk having the same thickness and groove structure. Using the same optical apparatus and the same writing strategy (writing power $P_w$=13 mW, reading power $P_r$=0.44 mW), a signal/noise ratio C/N=43 dB was measured at a linear velocity of V=4.19 m/s.

Example 5

Production of a Pellet 170 mg of dichlorosilicon phthalocyanine ($SiCl_2Pc$) (for formula, see Example 1) were pressed to form a pellet at 10 bar in a KBr press as is typically utilized for producing potassium bromide pellets for IR spectroscopy. The diameter was 1.2 mm and the thickness was 0.7–0.8 mm.

In the same way, the phthalocyanines of the formulas (Ib), (Ic), and (Id) could be converted into pellets.

What is claimed is:

1. An optical data carrier comprising a substrate that optionally has previously been coated with one or more reflection layers and to the surface of which has been applied a light-writeable information layer, optionally one or more reflection layers, and optionally a protective layer or a further substrate or a covering layer, such that the optical data carrier can be written on or read by means of blue light, wherein the information layer comprises (i) a light-absorbent compound comprising at least one phthalocyanine dye of the formula (I)

where

Me is a doubly axially substituted metal atom selected from the group consisting of Si, Ge, and Sn, Pc is an unsubstituted phthalocyanine, and $X_1$ and $X_2$ are each, independently of one another, halogen.

2. An optical data carrier according to claim 1 wherein the substrate is transparent.

3. An optical data carrier according to claim 1 wherein the blue light is a blue laser light.

4. An optical data carrier according to claim 1 wherein the blue light has a wavelength of 360 to 460 nm.

5. An optical data carrier according to claim 1 wherein the radicals $X_1$ and $X_2$ are each chlorine.

6. An optical data carrier according to claim 1 wherein the light-absorbent compound corresponds to at least one phthalocyanine of the formula (Ia), (Ib), (Ic), or (Id)

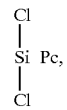

(Ia)

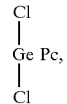

(Ib)

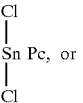

(Ic)

(Id)

7. A light-absorbent compound for use in an information layer of optical storage media comprising a phthalocyanine of the formula (I)

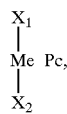

where

Me is a doubly axially substituted metal atom selected from the group consisting of Si, Ge, and Sn, Pc is an unsubstituted phthalocyanine, and $X_1$ and $X_2$ are each, independently of one another, halogen.

8. A light-absorbent compound according to claim 7 comprising more than 90% by weight of a phthalocyanine of the formula (I), based on the total light-absorbent compound.

9. A method of producing optical storage media comprising applying to a substrate a light-writeable information layer containing a light-absorbent compound comprising a phthalocyanine

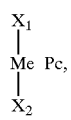

where

Me is a doubly axially substituted metal atom selected from the group consisting of Si, Ge, and Sn, Pc is an unsubstituted phthalocyanine, and $X_1$ and $X_2$ are each, independently of one another, halogen.

10. A method according to claim 9 wherein the light-absorbent compound comprises more than 90% by weight, of the phthalocyanine of the formula (I), based on the total light-absorbent compound.

11. A particulate solid preparation of a compound of the formula (I)

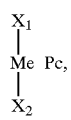

where

Me is a doubly axially substituted metal atom selected from the group consisting of Si, Ge, and Sn, Pc is an unsubstituted phthalocyanine, and $X_1$ and $X_2$ are each, independently of one another, halogen, wherein particles of the particulate solid preparation have a mean particle size of from 0.5 μm to 10 mm.

80 to 100% by weight of phthalocyanine, 0.1 to 1.0% by weight of residual moisture, 0 to 10% by weight of inorganic salts, and 0 to 10% by weight of further additives, where the percentage are in each case based on the preparation and the sum of the percentages is 100%.

12. A preparation according to claim 11 wherein the additives comprise dispersants, surfactants, and/or wetting agents.

13. A solid shaped body comprising a phthalocyanine of the formula (I),

where

Me is a doubly axially substituted metal atom selected from the group consisting of Si, Ge, and Sn, Pc is an unsubstituted phthalocyanine, and $X_1$ and $X_2$ are each, independently of one another, halogen.

14. A solid body according to claim 13 comprising more than 90% by weight of the phthalocyanine of formula (I), based on the shaped body.

15. A solid shaped body according to claim 13 in the form of pellets or rods.

16. A dispersions containing a metal complex of the formula (I),

where

Me is a doubly axially substituted metal atom selected from the group consisting of Si, Ge, and Sn, Pc is an unsubstituted phthalocyanine, and $X_1$ and $X_2$ are each, independently of one another, halogen.

17. A dispersion according to claim 16 that is an aqueous dispersion.

18. A dispersion according to claim 16 comprising more than 90% by weight of the phthalocyanine of formula (I), based on the dispersion.

19. An optical data carrier according to claim 1 that has been written on by means of blue light.

20. An optical data carrier according to claim 19 wherein the blue light is a blue laser light.

21. An optical data carrier according to claim 19 wherein the blue light has a wavelength of 360 to 460 nm.

* * * * *